(12) United States Patent  
Giametta

(10) Patent No.: US 8,162,007 B2
(45) Date of Patent: Apr. 24, 2012

(54) APPARATUS, METHODS, AND/OR SYSTEMS RELATING TO THE DELIVERY OF A FLUID THROUGH A PASSAGEWAY

(75) Inventor: Andrew P. Giametta, Greenville, SC (US)

(73) Assignee: General Electric Company, Schenectady, NY (US)

( * ) Notice: Subject to any disclaimer, the term of this patent is extended or adjusted under 35 U.S.C. 154(b) by 583 days.

(21) Appl. No.: 12/394,138

(22) Filed: Feb. 27, 2009

(65) Prior Publication Data

US 2010/0221099 A1 Sep. 2, 2010

(51) Int. Cl.
*F16L 9/14* (2006.01)
*F04D 29/02* (2006.01)
*F04D 29/58* (2006.01)

(52) U.S. Cl. ........ 138/114; 415/116

(58) Field of Classification Search .......... 415/115, 415/116, 144, 175, 176
See application file for complete search history.

(56) References Cited

U.S. PATENT DOCUMENTS

| 4,136,516 A * | 1/1979 | Corsmeier | 60/39.091 |
|---|---|---|---|
| 5,025,862 A * | 6/1991 | Showalter | 166/303 |
| 6,210,791 B1 | 4/2001 | Skoog et al. | |
| 6,854,487 B2 * | 2/2005 | Witemyre et al. | 138/114 |
| 2004/0261875 A1 * | 12/2004 | Witemyre et al. | 138/114 |
| 2005/0196278 A1 * | 9/2005 | Boswell | 416/97 R |
| 2006/0285968 A1 * | 12/2006 | Riahi et al. | 415/115 |
| 2007/0031249 A1 * | 2/2007 | Jones | 415/200 |
| 2007/0138000 A1 | 6/2007 | Hartig | |

* cited by examiner

*Primary Examiner* — Thomas L Dickey
*Assistant Examiner* — Joseph Schoenholtz
(74) *Attorney, Agent, or Firm* — Mark E. Henderson; Ernest G. Cusick; Frank A. Landgraff

(57) ABSTRACT

A method of constructing an industrial machine such that, in operation, a supply of a fluid coolant through a hollow passageway is delivered at a reduced temperature, the method including the steps of: a) identifying at least a section of the hollow passageway that transports or is meant to transport the fluid coolant through a space that resides at a temperature that is significantly higher than a desired temperature of the fluid coolant; and b) through at least a majority of the identified section of the hollow passageway that transports the fluid coolant through the space that resides at the temperature that is significantly higher than the desired temperature of the fluid coolant, constructing the hollow passageway such that the outer surface of the hollow passageway has an emissivity coefficient less than about 0.1.

11 Claims, 3 Drawing Sheets

APPARATUS, METHODS, AND/OR SYSTEMS RELATING TO THE DELIVERY OF A FLUID THROUGH A PASSAGEWAY

BACKGROUND OF THE INVENTION

This present application relates generally to apparatus, methods and/or systems concerning improved fluid delivery through pipes or passageways in industrial and other applications. More particularly, but not by way of limitation, the present application relates to apparatus, methods and/or systems pertaining to improved delivery of a fluid gas through a passageway with low emissivity characteristics such that the flow is delivered with a lower relative temperature.

In many industrial applications, machine parts are exposed to high temperatures. Often, a fluid coolant, such as water or air, is piped to the part through a hollow passageway and, upon the reaching the part, directed such that it flows over or through the part and, thereby, cools it. To the extent that it reaches the part at a lower temperature, the coolant is more effective at cooling it. However, to reach many part locations in industrial applications, such as, for example, hot-gas path parts in gas turbine engines, the coolant often has to flow through passageways that traverse areas of elevated temperature. Generally, these areas impart a significant amount of heat to the passageway or pipe through which the coolant flows, which, in turn, imparts a significant amount of heat to the coolant. This raises the temperature level of the coolant and, thereby, decreases the effectiveness of the coolant when it reaches the particular machine part it was meant to cool. As a result, there is a need for apparatus, methods and/or systems that improve the delivery of a fluid coolant through a passageway such that the coolant flow is delivered without absorbing heat from the passageway's surroundings. The present invention fulfills this need, and further provides related advantages as discussed in detail below.

BRIEF DESCRIPTION OF THE INVENTION

The present application thus describes a hollow passageway that is configured to direct the flow of a fluid, the hollow passageway comprising an outer surface that substantially has a low emissivity coefficient.

The present application further describes, in an industrial machine, a hollow passageway that is configured to transport a fluid coolant through a space that during operation resides at a significantly higher temperature than a desired temperature of the fluid coolant, wherein the hollow passageway comprises an outer surface that substantially has an emissivity coefficient less than about 0.1.

The present application further describes a method of constructing an industrial machine such that, in operation, a supply of a fluid coolant through a hollow passageway is delivered at a reduced temperature, the method including the steps of: a) identifying at least a section of the hollow passageway that transports or is meant to transport the fluid coolant through a space that resides at a temperature that is significantly higher than a desired temperature of the fluid coolant; and b) through at least a majority of the identified section of the hollow passageway that transports the fluid coolant through the space that resides at the temperature that is significantly higher than the desired temperature of the fluid coolant, constructing the hollow passageway such that the outer surface of the hollow passageway has an emissivity coefficient less than about 0.1.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
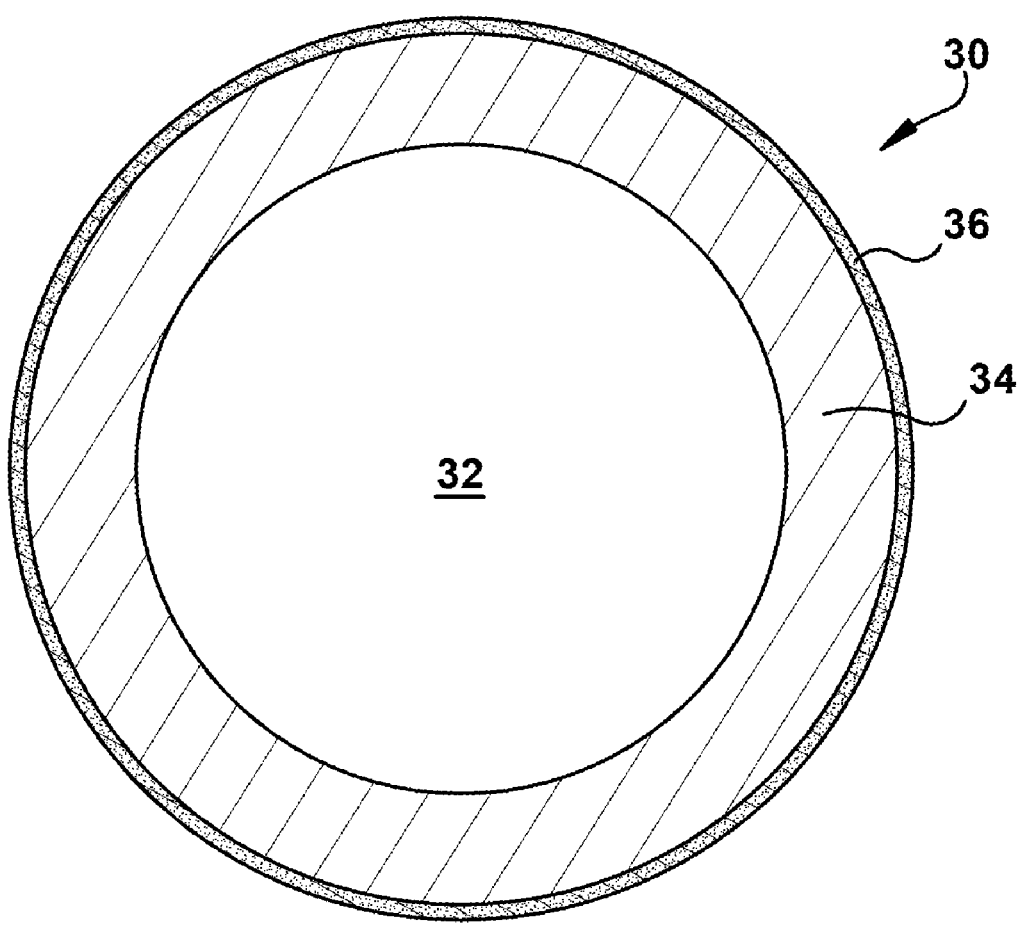
FIG. 1 is a schematic representation of an exemplary passageway or pipe according to an exemplary embodiment of the present application.

The emissivity of a material, which is usually written as "$\epsilon$", is the ratio of energy radiated by a particular material to energy radiated by a black body at the same temperature. It is a measure of a material's ability to radiate absorbed energy. A true black body would have an $\epsilon=1$ while any real object would have $\epsilon<1$. Emissivity, which is often expressed as an "emissivity coefficient", is a dimensionless quantity (i.e., does not have units). In general, the duller and blacker a material is, the closer its emissivity coefficient is to 1. Whereas, the more reflective a material is, the lower its emissivity coefficient.

It is known in the art that the use of low emissivity coatings may be applied to the surfaces of machine parts that are exposed to high temperatures. In this manner, the amount of heat absorbed by the part may be lessened. Thus, if, for example, an oppositely disposed surface of the part is cooled with a flow of cooling air, the maximum temperature reached by the part will be determined by a balance between the amount of heat that enters the part from the heated surface and the amount of heat removed by the cooling air flow over the cooled surface. The combination of cooling the part in this manner and limiting (with a low emissivity coating) the heat absorbed results in a part that operates at a lower temperature, which, in general, allows the part to operate more effectively and/or have a longer life.

The invention of the present application involves using materials with a relatively low emissivity coefficient to construct or use as an outer coating to passageways or pipes that transport a fluid such that the passageway absorbs less energy and, thereby, the fluid absorbs less energy during transport. That is, the outer surface of the passageway, according to the present invention, is formed with a material that has a low emissivity coefficient such that the fluid flowing through the passageway absorbs less energy from the space that surrounds the passageway than it would if the outer surface of the passageway is formed with a material with higher emissivity coefficient.

In some embodiments of the present application, a material having a "low" emissivity coefficient may be defined as any material that has an emissivity coefficient of less than approximately 0.1. In other more preferred embodiments, a "low" emissivity coefficient may be defined as any material that has an emissivity coefficient of less than approximately 0.06. In other more ideal embodiments, a "low" emissivity coefficient may be defined as any material that has an emissivity coefficient of less than approximately 0.03. Note, as used herein, "emissivity" or "emissivity coefficient" is the radiation of heat from a "grey body" according to the Stefan-Boltzmann Law compared with the radiation of heat from an ideal "black body" with the emissivity coefficient $\epsilon=1$. Further, as the emissivity coefficients for some materials vary with temperature, the emissivity coefficients identified herein are based on the emissivity at a temperature of 300 K.

Typically, as one of ordinary skill in the art will appreciate, industrial applications that transport or direct a fluid through areas of elevated temperature use a passageway formed with an outer layer of steel or stainless steel. The emissivity coefficient of steel and stainless steel generally ranges between 0.1 (if highly polished) and 0.8. While the emissivity coefficient of steel and stainless steel when polished is relatively low, in practice, the use of such steel or stainless steel does not render a low emissivity value for a long period. That is, with use, the steel or stainless steel becomes weathered, which causes its emissivity coefficient to rise steeply toward the higher end of the above-referenced range.

Consistent with embodiments of the present application, passageways may be formed that have an outer surface or coating of a material with a low emissivity coefficient. For example, FIG. 1 illustrates a section view of a passageway 30 consistent with the present application. The passageway 30 may have an inner channel 32 through which a coolant may flow. The inner channel 32 may be bound by a wall 34, the outer surface of which then may be covered by a material that forms an outer surface coating 36. As described, the outer surface coating 36 may be formed with a material that has an emissivity coefficient of less than about 0.1. Accordingly, in an exemplary embodiment of the present invention, the outer surface coating 36 may be formed with a coating of cadmium (which, generally, has an emissivity coefficient of approximately 0.02). In another exemplary embodiment of the present invention, the outer surface coating 36 may be formed with a coating of chromium (which, generally, has an emissivity coefficient of approximately 0.07). In another exemplary embodiment of the present invention, the outer surface coating 36 may be formed with a coating of polished copper (which, generally, has an emissivity coefficient of approximately 0.03). In another exemplary embodiment of the present invention, the outer surface coating 36 may be formed with a coating of a copper nickel alloy (which, generally, has an emissivity coefficient of approximately 0.06). In another exemplary embodiment of the present invention, the outer surface coating 36 may be formed with a coating of electroplated nickel (which, generally, has an emissivity coefficient of approximately 0.03). In another exemplary embodiment of the present invention, the outer surface coating 36 may be formed with a coating of polished nickel (which, generally, has an emissivity coefficient of approximately 0.07). In another exemplary embodiment of the present invention, the outer surface coating 36 may be formed with a coating of platinum (which, generally, has an emissivity coefficient of approximately 0.05). In another exemplary embodiment of the present invention, the outer surface coating 36 may be formed with a coating of silver (which, generally, has an emissivity coefficient of approximately 0.06 and, when polished, has an emissivity coefficient of approximately 0.03). In another exemplary embodiment of the present invention, the outer surface coating 36 may be formed with a coating of unoxidized tin (which, generally, has an emissivity coefficient of approximately 0.04). In another exemplary embodiment of the present invention, the outer surface coating 36 may be formed with a coating of polished tungsten (which, generally, has an emissivity coefficient of approximately 0.04). In another exemplary embodiment of the present invention, the outer surface coating 36 may be formed with a coating of gold (which, generally, has an emissivity coefficient of approximately 0.03).

It will be appreciated that the wall 34 may be formed with any of the previously listed low emissivity materials, in which case there would be no need for an outer surface coating 36. Given the general expense of some of the low emissivity materials and their poor strength characteristics, the minimalistic use of them as outer surface coatings may be more cost-effective.

Figure 2:
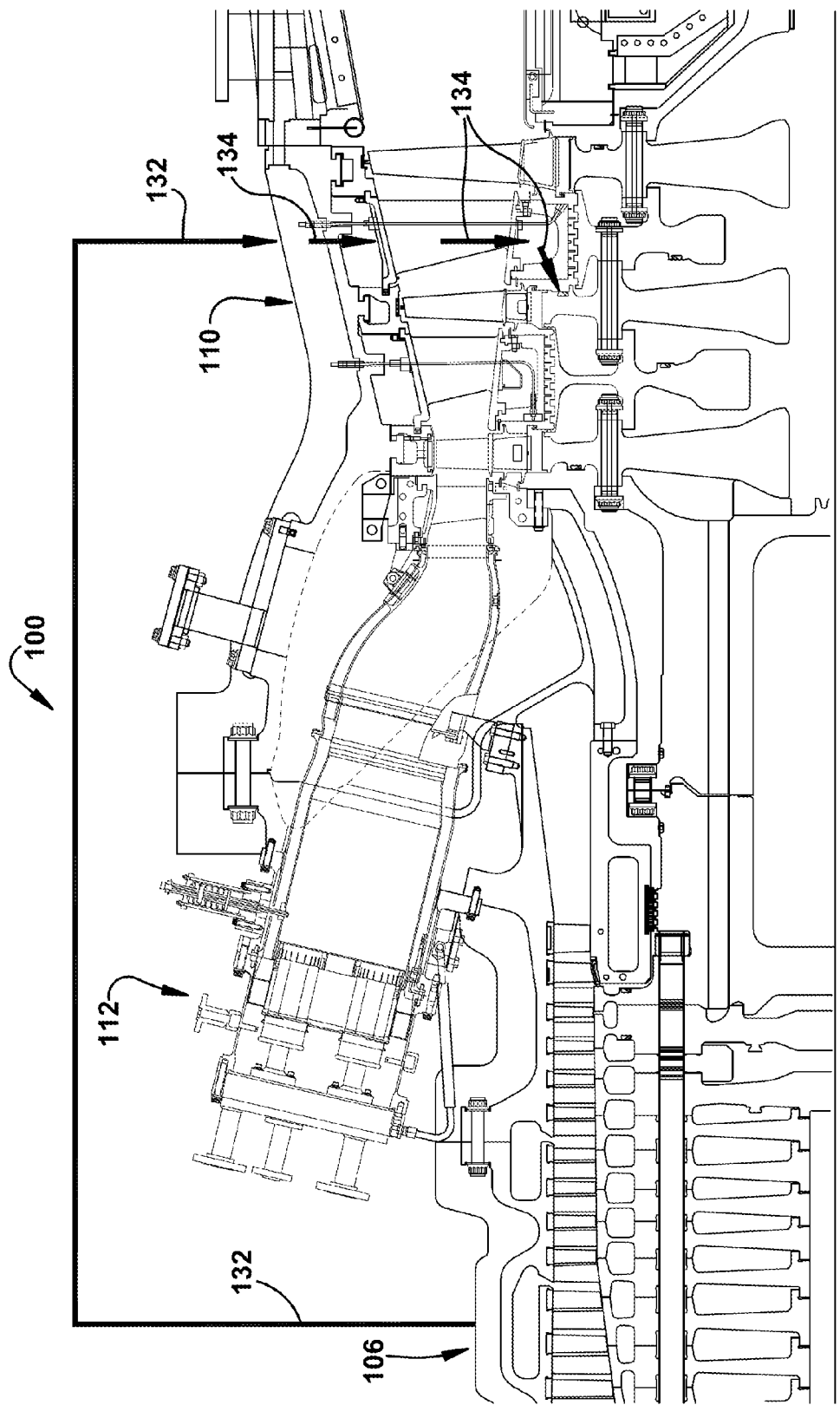
FIG. 2 is a section view of a turbine engine in which an application of an embodiment of the present invention may be used.

As stated, the invention of the present application may be used in many industrial applications. For the sake of illustration, an exemplary application will be described. This application involves transporting a coolant, in this case compressed air, through a gas turbine engine to cool parts, the location of which require the transporting passageway to pass through areas of extreme temperatures. This type of application may be common to many industrial applications. Referring to FIG. 2, a schematic representation of a gas turbine engine 100 is illustrated. In general, as one of ordinary skill in the art will appreciate, gas turbine engines operate by extracting energy from a pressurized flow of hot gas that is produced by the combustion of a fuel in a stream of compressed air. Gas turbine engine 100 may be configured with an axial compressor 106 that is mechanically coupled by a common shaft or rotor to a downstream turbine section or turbine 110, and a combustor 112 positioned between the compressor 106 and the turbine 110. Note, as stated, the invention of the present application may be used in all types of industrial applications and other types of uses, including gas turbine engines, aircraft engines and others. Hereinafter, the invention will be described in relation to gas turbine engines. This description is exemplary only and not intended to be limiting.

As shown, the compressor 106 may include a plurality of stages. Each stage may include a row of compressor rotor blades followed by a row of compressor stator blades. Thus, a first stage may include a row of compressor rotor blades, which rotate about a central shaft, followed by a row of compressor stator blades, which remain stationary during operation. The compressor stator blades generally are circumferentially spaced one from the other and fixed about the axis of rotation. The compressor rotor blades are circumferentially spaced and attached to the shaft such that when the shaft rotates during operation, the compressor rotor blades 120 rotate about it. The compressor rotor blades 120 are configured such that, when spun about the shaft, they impart kinetic energy to the air or working fluid flowing through the compressor 106.

The turbine 110 also may include a plurality of stages. A stage may include, as shown, a plurality of turbine buckets or turbine rotor blades, which rotate about the shaft during operation, and a plurality of nozzles or turbine stator blades, which remain stationary during operation. The turbine stator blades generally are circumferentially spaced one from the other and fixed about the axis of rotation. The turbine rotor blades may be mounted on a turbine wheel for rotation about the shaft. It will be appreciated that the turbine stator blades and turbine rotor blades lie in the hot gas path of the turbine.

In use, the rotation of compressor rotor blades within the axial compressor 106 may compress a flow of air. In the combustor 112, energy may be released when the compressed air is mixed with a fuel and ignited. The resulting flow of hot gases from the combustor 112 then may be directed over the turbine rotor blades in the turbine 110, which may induce the rotation of the turbine rotor blades about the shaft, thus transforming the energy of the hot flow of gases into the mechanical energy of the rotating blades and, because of the connection between the rotor blades in the shaft, the rotating shaft. The mechanical energy of the shaft may then be used to drive the rotation of the compressor rotor blades, such that the necessary supply of compressed air is produced, and also, for example, a generator to produce electricity.

Those skilled in the art will appreciate that compressed air is often bled from the compressor 106 and channeled to areas within the turbine 110. In one such application, as depicted by arrow 132, purge air may be bled from the latter stages of the compressor and directed via a passageway or pipe outside of the turbine casing to the stator blades of the third stage of the turbine 110. At this location, the purge air, as further indicated by arrows 134, may be directed back into the turbine casing and piped in a radially inward direction (using, for a portion of the distance, a channel through the turbine stator blades) to a location near the rotor wheels and shaft where the purge are is required.

Figure 3:
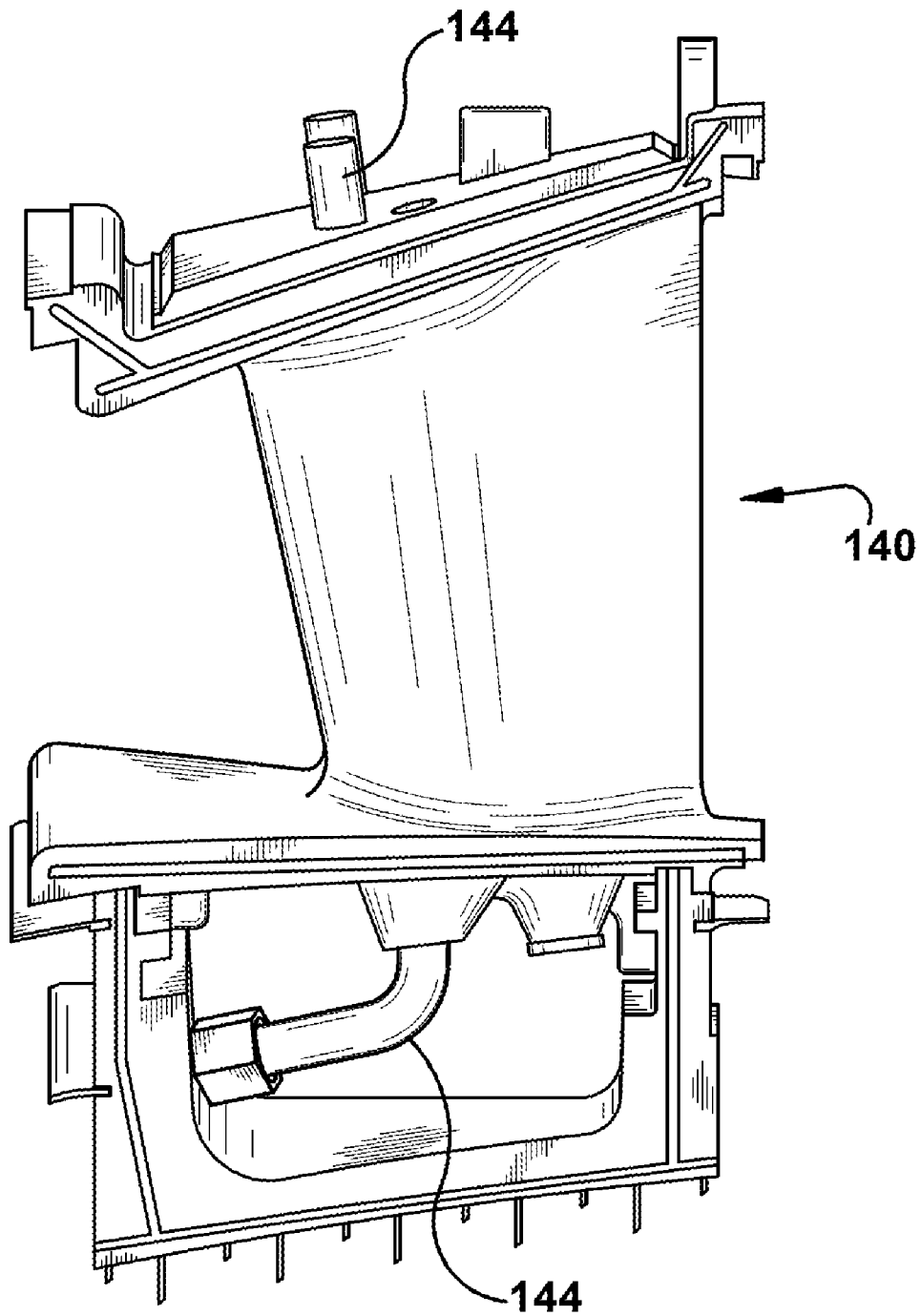
FIG. 3 is a view of a turbine stator blade that may be used in the turbine section of the turbine engine shown in FIG. 2.

FIG. 3 illustrates an exemplary stator blade 140 and the orientation of a purge air delivery pipe 144 that may be in the system described above to deliver purge air from the compressor 106 to a position that is radially inward of the stator blade 140. As shown, the purge air delivery pipe 144 may include an initial section that runs from a radially outward position, which may be located near the turbine casing that surrounds the turbine, to the stator blade 140. The purge air then may flow through the stator blade 140, the passageway for which is not shown in FIG. 3, and continue in a radially inward direction through a second section of the purge air delivery pipe 144. The second section of the purge air delivery pipe 144 may direct the purge air from the stator blade 140 to a position that is radially inward of the stator blade 140, where the purge air may be released. As one of ordinary skill in the art will appreciate, the purge air, once delivered, may both cool the rotor wheels and shaft of the turbine 110 and create a positive pressure flow through that space that helps prevent the hot-gas of the working fluid from reaching that inner radial position. The cooler the purge air is at delivery, the more effective it is at performing these functions.

It will be appreciated that the purge air delivery pipe 144, once inside the turbine casing, traverses through a space wherein it is surrounded by extreme temperatures. In conventional systems, the purge air delivery pipe 144 is constructed with steel or stainless steel and, thus, has an emissivity coefficient of approximately 0.5 to 0.8. As a result, a significant amount of heat is transferred through the purge air delivery pipe 144 between the surrounding areas of extreme heat and the coolant, i.e., the compressed air, flowing therethrough. Pursuant to embodiments of the present application, the purge air delivery pipe 144 may be constructed of or have a coating made of a material with a low emissivity coefficient, i.e., a material that has a emissivity coefficient of less than about 0.1 or, more preferably, less than about 0.06 or, ideally, less than about 0.03. Test data confirms that a reduction in the emissivity coefficient of this nature and magnitude for the purge air delivery pipe 144 has a significant impact in decreasing the temperature of the purge air at its release point.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. A hollow passageway that is configured to direct the flow of a fluid, the hollow passageway comprising an outer surface that substantially has a low emissivity coefficient;
   wherein the low emissivity coefficient comprises an emissivity coefficient of less than about 0.03.

2. The hollow passageway of claim 1, wherein the outer surface comprises one of cadmium, chromium, polished copper, copper nickel alloy, electroplated nickel, polished nickel, platinum, silver, polished silver, unoxidized tin, polished tungsten, and gold.

3. The hollow passageway of claim 1, wherein the hollow passageway comprises an inner channel bound by a wall and, covering the outer surface of the wall, an outer surface coating that is formed with a material that provides the outer surface that substantially has an emissivity coefficient of less than about 0.03.

4. The hollow passageway of claim 3, wherein the outer surface coating comprises one of cadmium, chromium, polished copper, copper nickel alloy, electroplated nickel, polished nickel, platinum, silver, polished silver, unoxidized tin, polished tungsten, and gold.

5. In an industrial machine, a hollow passageway that is configured to transport a fluid coolant through a space that during operation resides at a significantly higher temperature than a desired temperature of the fluid coolant, the hollow passageway comprising an outer surface that substantially has an emissivity coefficient less than about 0.03.

6. The hollow passageway of claim 5, wherein the hollow passageway comprises an inner channel bound by a wall and, covering the outer surface of the wall, an outer surface coating that is formed with a material that provides the outer surface that substantially has an emissivity coefficient of less than about 0.03.

7. The hollow passageway of claim 5, wherein the outer surface coating comprises one of cadmium, chromium, polished copper, copper nickel alloy, electroplated nickel, polished nickel, platinum, silver, polished silver, unoxidized tin, polished tungsten, and gold.

8. The hollow passageway of claim 5, wherein:
   the industrial machine is a gas turbine engine; and
   the hollow passageway is configured to transport compressed air extracted from the compressor to a location in the turbine.

9. The hollow passageway of claim 8, wherein the hollow passageway comprises a purge air delivery pipe.

10. A method of constructing an industrial machine such that, in operation, a supply of a fluid coolant through a hollow passageway is delivered at a reduced temperature, the method including the steps of:
    a) identifying at least a section of the hollow passageway that transports or is meant to transport the fluid coolant through a space that resides at a temperature that is significantly higher than a desired temperature of the fluid coolant; and
    b) through at least a majority of the identified section of the hollow passageway that transports the fluid coolant through the space that resides at the temperature that is significantly higher than the desired temperature of the fluid coolant, constructing the hollow passageway such that the outer surface of the hollow passageway has an emissivity coefficient less than about 0.03.

11. The method of claim 10, wherein the industrial machine comprises a gas turbine engine having a compressor section and a turbine section; and
   wherein the identified section of the hollow passageway is configured to transport compressed air extracted from the compressor section to a location in the turbine section.

* * * * *